United States Patent [19]

DiMatteo et al.

[11] 4,337,566

[45] Jul. 6, 1982

[54] GAUGING SYSTEM FOR MACHINING SURFACES

[75] Inventors: Paul DiMatteo, Huntington; Robert Segnini, Stony Brook; Paul Rademacher, Glen Head, all of N.Y.

[73] Assignee: Solid Photography, Inc., Melville, N.Y.

[21] Appl. No.: 157,435

[22] Filed: Jun. 9, 1980

[51] Int. Cl.³ .................... B23P 13/02; B23C 3/16; B23B 35/00

[52] U.S. Cl. .................... 29/558; 29/26 A; 51/326; 408/1 R; 409/84; 409/95; 409/131

[58] Field of Search .................... 29/26 A, 558, 650; 409/84, 131, 132, 139, 120, 119, 95, 244, 293, 104; 408/1; 51/323, 326, 165.72

[56] References Cited

U.S. PATENT DOCUMENTS

| | | | |
|---|---|---|---|
| 2,785,608 | 3/1957 | Walti | 409/95 |
| 3,195,411 | 7/1965 | MacDonald | 409/84 X |
| 3,472,122 | 10/1969 | Vertin | 409/84 |

FOREIGN PATENT DOCUMENTS 55-101308  8/1980  Japan .................... 409/84

Primary Examiner—William R. Briggs
Attorney, Agent, or Firm—Max Fogiel

[57] ABSTRACT

An arrangement for removing excess material from an object surface, to provide a desired finished surface. Holes are drilled into the object so that the bottoms of the holes lie on the desired finished surface. The holes have a shape so that the observed hole diameter at the prevailing surface of the object is dependent on the hole depth and thereby dependent on the amount of material remaining to be removed between the prevailing surface and the desired finished surface. The prevailing surface is continuously observed and measured, and the depths of material to be removed in a sequence of steps is calculated dependent on the measurements of the prevailing surface and the coordinates of the desired finished surface. As a result of the calculations, the depth of material removed during each step is controlled, so that upon carrying out a sequence of such steps, the surface exposed on the object after the last step has been carried out, coincides with the desired finished surface. The accuracy of the material removal equipment may be substantially less than the accuracy of the finished surface.

11 Claims, 7 Drawing Figures

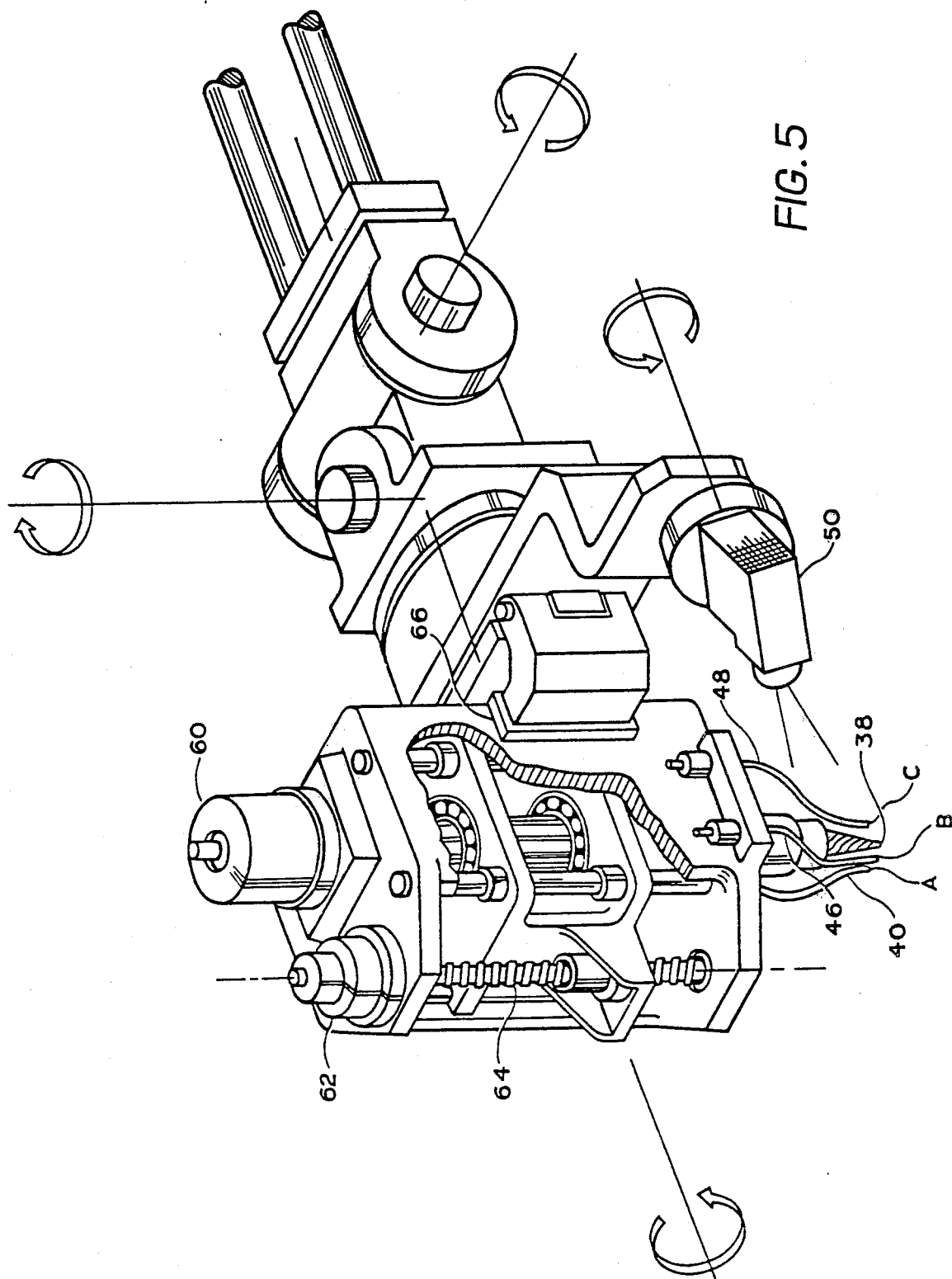

GAUGING SYSTEM FOR MACHINING SURFACES

BACKGROUND OF THE INVENTION

An automated system for finishing (grinding, sanding, milling etc.) of flat, contoured or complex sculptured surfaces requires a high degree of positional dexterity in the finishing equipment. Such dexterity (as found typically in industrial robots) is usually accompanied by limited absolute positional accuracy in the equipment. If finishing accuracies for the final surface are to be greater than the absolute positional accuracy of the finishing equipment, then some type of active feedback control mechanism must be implemented. This mechanism must monitor the material thickness left to be removed and thereby modify and stop the material removal process at the proper level.

SUMMARY OF THE INVENTION

The present invention provides this feedback function via continuous optical sensing of holes previously drilled into the surface. The bottom of the holes lies on the desired finished surface. The shape of the holes is such that the observed hole diameter at the material surface is proportional to the hole depth, and therefore, also proportional to the amount of material remaining to be removed. A simple optical sensor and associated signal processing can continuously observe the surface and provide the "depth to go" feedback based upon the observed hole diameter.

The depth to which the holes are drilled below the initial surface is controlled by data obtained from an external measurement system. This system must have measurement accuracy equivalent to the desired finished surface accuracy. An accurate coordinate map of the initial surface is thus provided by this measurement system. The distance (normal to the surface) between this map and the desired finished surface provides the depth required for each hole. The holes can be drilled to an accurate depth by the less accurate finishing equipment, by employing an accurate depth control stop (referenced to the surface) on the drill mechanism itself.

Thus, the entire finishing process can be implemented using material removal equipment of relatively poor accuracy but high dexterity. The ultimate system accuracy is provided by the external measurement system. The latter equipment exhibits high accuracy at the expense of dexterity, and is not a part of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a schematic view of a drilling mechanism and optical sensor whereby the accuracy of the drilling depth is achieved by appropriate referencing to the object surface.

DESCRIPTION OF THE PREFERRED EMBODIMENTS

Figure 1:
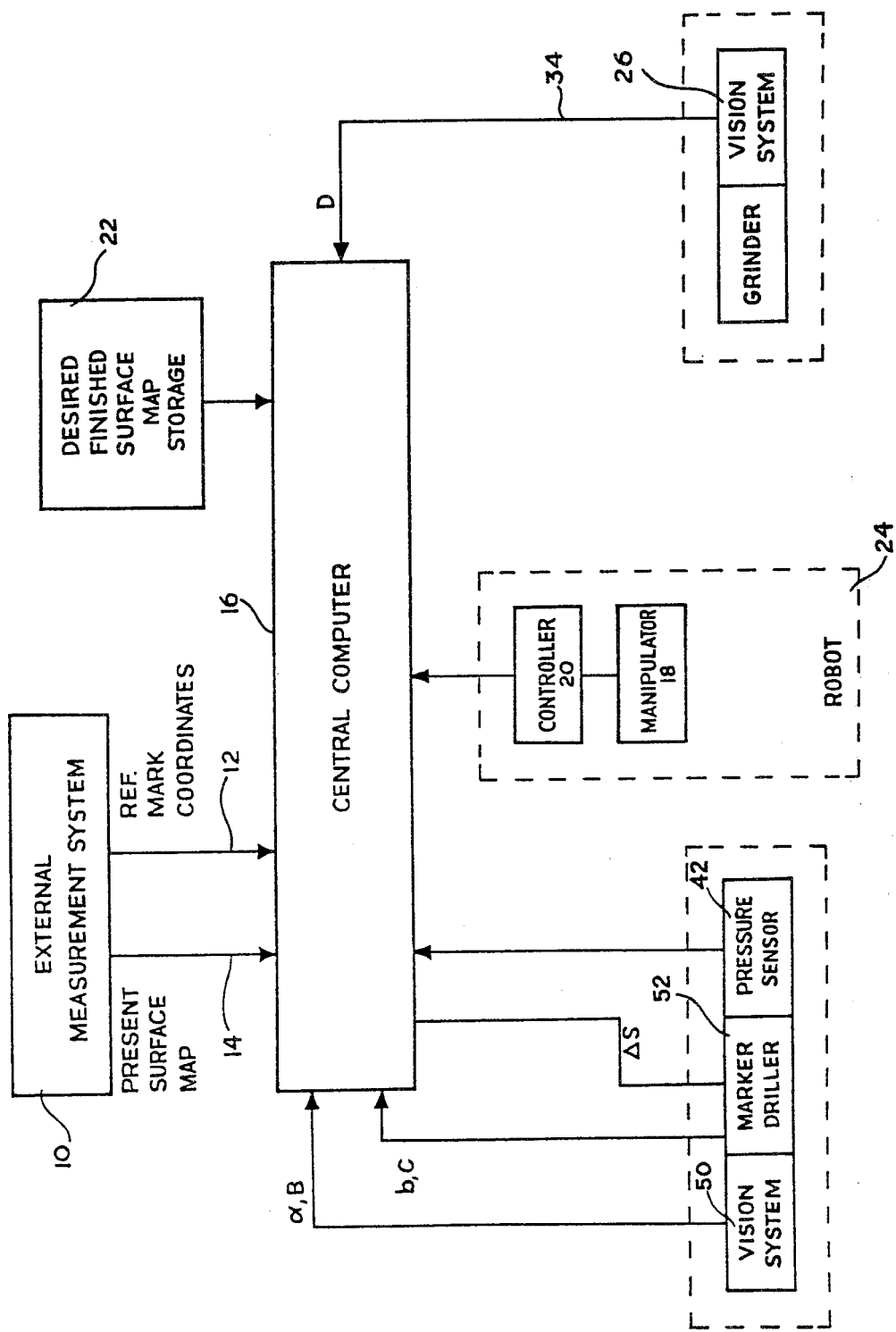
FIG. 1 is a block diagram of the essential elements of the arrangement in accordance with the present invention.

An overall block diagram of the system is shown in FIG. 1. It operates in conjunction with an external measurement subsystem 10 capable of measuring the 3-D surface coordinates to the accuracy required of the desired finished surface. This subsystem 10 can also measure the position of reference marks 12 on the surface.

The external measurement subsystem 10 measures the objects' unfinished surface, creating a 3-D surface map. The data 14 describing this surface map is fed into the finishing system central computer 16.

Based on a reference pattern algorithm operating on the inputted surface map, the computer directs a robot manipulator 18 (via controller 20) to place a reference grid pattern on the object surface using its marker stylus. The external measurement system 10 measures the precise position of these grid marks on the surface. The data describing these reference mark positions is fed into the finishing system central computer 16.

The desired 3-D finished surface map is transferred to the computer from a storage medium 22. The computer calculates the "excess material" between the unfinished and desired finished surfaces at each reference mark position, and commands the robot 24 to drill holes into the object surface to a depth equal to the excess material calculated at that point. The entire object surface is then painted.

The computer commands the robot, thereupon, to grind the surface to remove excess material. The initial grinding pattern is determined by a special control algorithm operating on the computed excess material map. This first pass with the grinder removes all surface paint except that left in the holes. This provides the contrast required to make the holes visible to the grinder vision system 26. Thereafter, the vision system on the grinder observes the depth of the remaining holes (i.e., the excess surface material) and thus updates the excess material map. This, in turn, causes the grinding pattern to be continuously modified to smoothly and evenly bring the object surface down to the desired finished surface. When the holes are no longer visible, the grinding process is terminated.

The external measurement subsystem 10 has an accuracy capability equivalent to the desired surface finish accuracy. It provides, as input to the finishing system, a map 14 of the measured surface of the object to be finished as well as the coordinates 12 of reference marks previously placed on the object surface. This data is provided in any 3-D coordinate system convenient to the measurement subsystem, and is transposed by the central computer 16 to the coordinate system of the finishing equipment 24, 28, 44 (the robot). This transposition requires that the position and orientation in space of the measurement subsystem be known with respect to the finishing system. Normal surveying techniques will provide this relationship to the accuracy required. The external measurement subsystem can be implemented in any of a number of ways, and is not a part of the present invention. It can even be means whereby the measurements are carried out manually.

The desired finish surface map is fed to the central computer 16 from any convenient mass storage medium 22, such as magnetic tape. It describes the desired 3-D coordinates of the finished surface of the object in any convenient coordinate system. In practice, the latter coordinate system would usually be related in some manner to the object itself. For instance, an object having an axis of revolution might most conveniently be described in a cylindrical coordinate system centered on that axis. In the central computer 16, the desired surface map data is transposed into the coordinate system of the finishing equipment 24, 28, 44.

Figure 2:
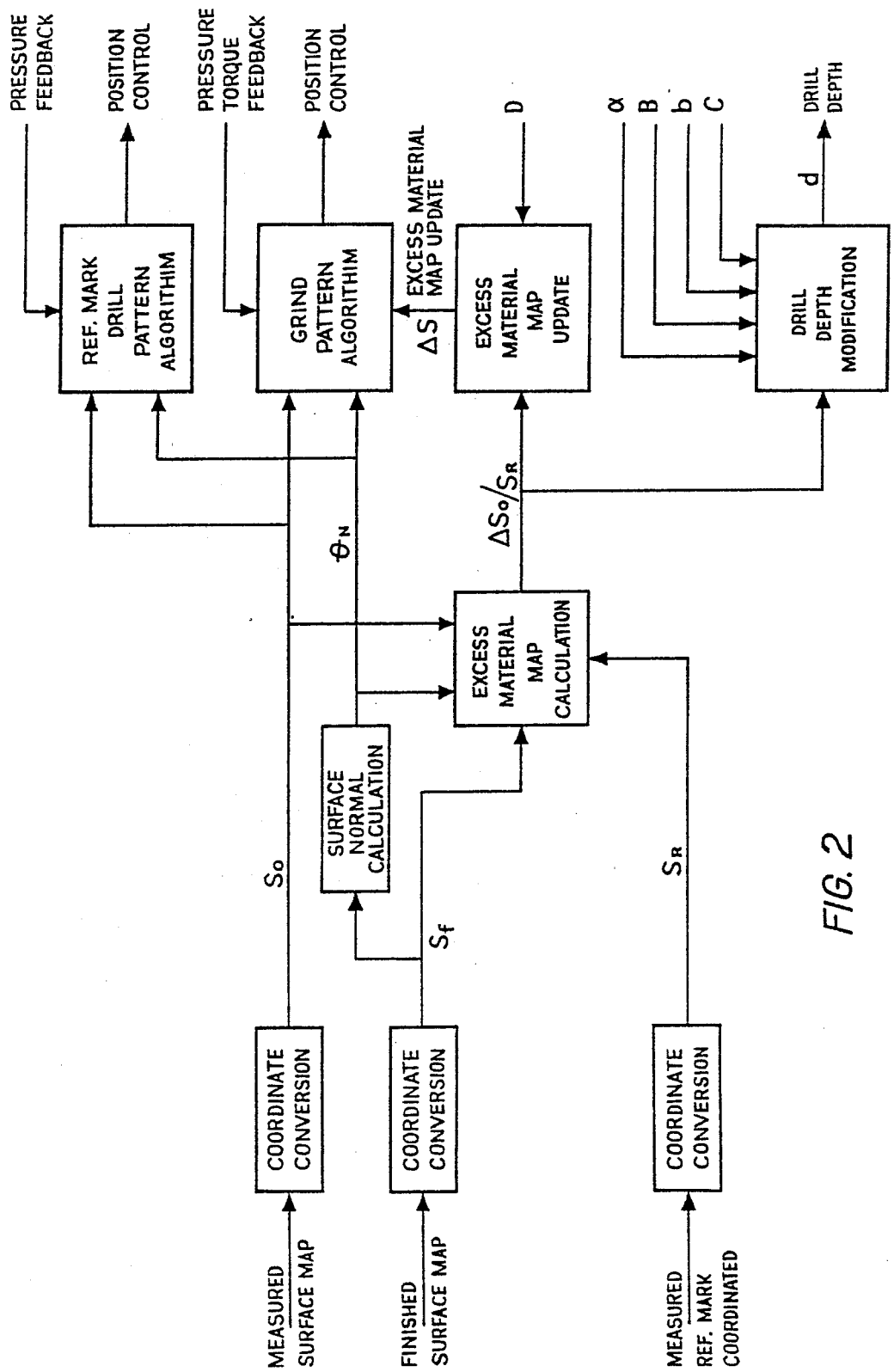
FIG. 2 is a block diagram and shows the basic operation carried out by the central computer in FIG. 1.

In FIG. 2, the basic operations of the central computer 16 are shown in block diagram form. The measured surface map (from the external measurement subsystem 10) and the finished surface map (from the mass storage medium 22) are transposed to the finishing system coordinates as described above. These transposed maps are denoted as $s_o$ and $s_f$ respectively. The computer also calculates the surface normals ($\theta_N$) to $s_f$ at each point on the desired finished surface. The measured surface ($s_o$) and the normals to the finished surface ($\theta_N$) are inputs to both the reference mark/drill pattern subroutine and the grind pattern subroutine. In the former subroutine $s_o$, in conjunction with a stored pattern generation algorithm, determines the reference marker or drill position for the robot. Angles $\theta_N$ determine the orientation in space of the marker or drill. In the latter subroutine, So, in conjunction with a grinding pattern algorithm, determines the position and maneuvering of the grinder 30 in space. The angles $\theta_N$ determines its orientation in space, and assures that grinding is always done normal to the desired surface.

Figure 3:
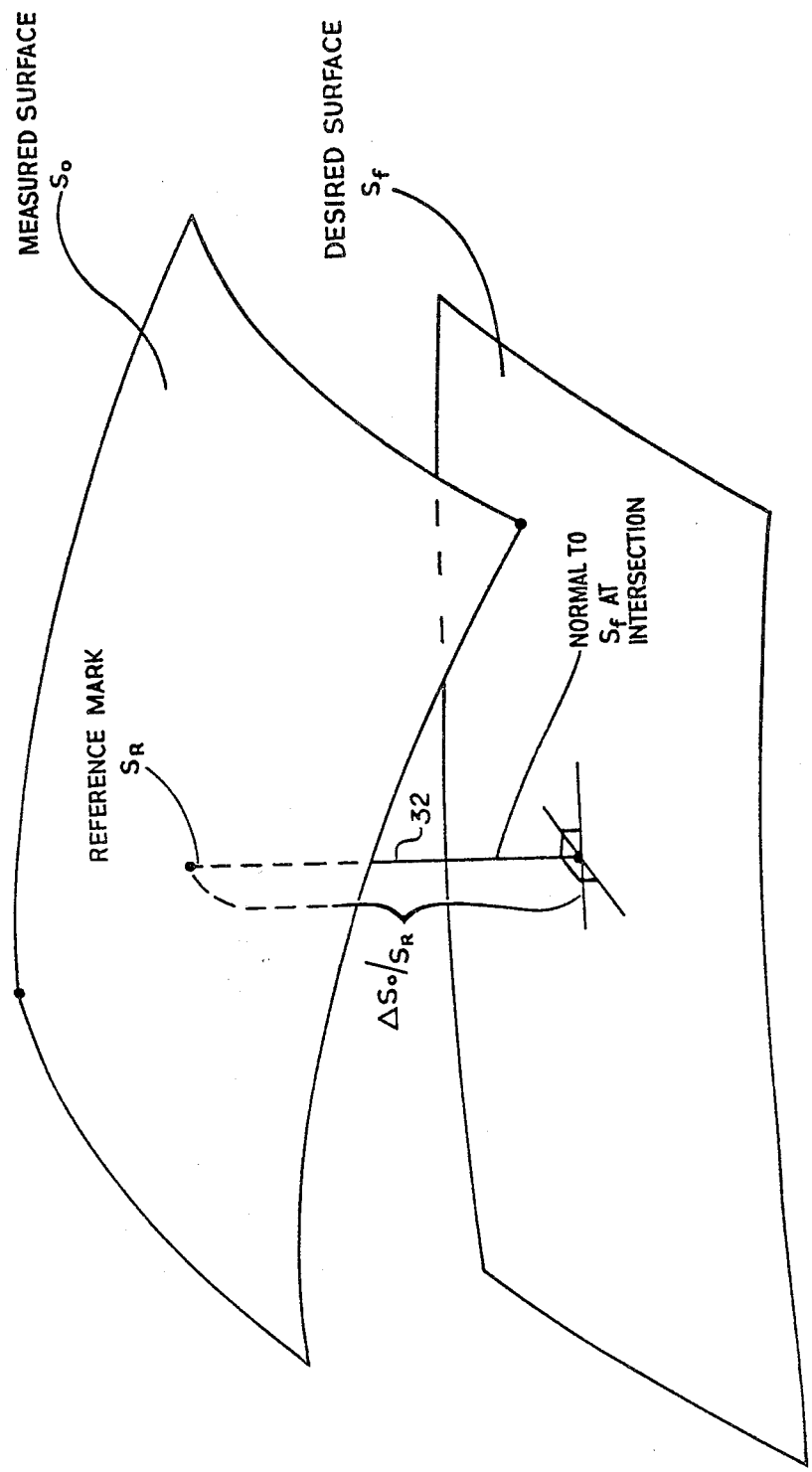
FIG. 3 is a schematic view and illustrates the parameters from which the amount of material to be removed is calculated.

As material is removed, the grinding pattern is modified by an excess material map. This describes the excess material vs. position on the surface. It controls the grinding pattern to remove this material in a manner so as to slowly and evenly bring the object surface down to the desired surface. The initial excess material map $\Delta S_o | S_R$ is generated from $s_o$, $s_f$ and $\theta_N$ as shown in FIG. 3. Excess material is defined as the distance between surface $s_o$ and $s_f$ along the line 32 which is normal to the desired surface $s_f$. The excess material is calculated at each reference mark point $S_R$ whose coordinates are supplied by the external measurement subsystem. The calculated excess material at these points $\Delta S_o | S_R$ provides both the depth data for drilling of the reference holes, as well as the initial excess material map.

Figure 4:
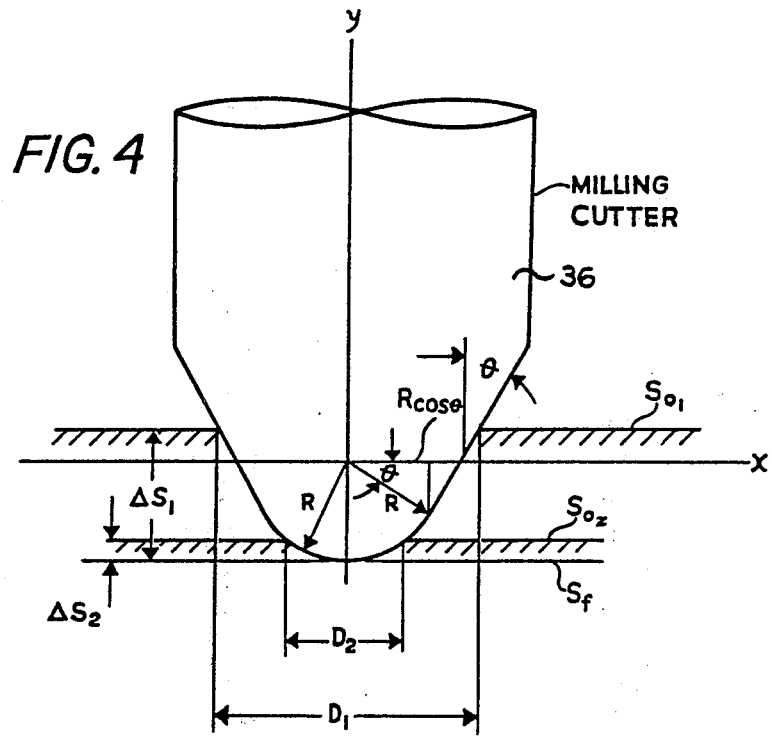
FIG. 4 is a diagrammatic view of a milling cutter or drill used to remove material.

The vision system 26 in the grinder 30 continuously observes the diameter of the holes as grinding takes place. These diameters are related to the excess material remaining in the manner described in FIG. 4. The hole diameter (i.e. excess material) information is fed to the computer by loop 34 to continually update the excess material map and thus modify the grinding pattern accordingly. As indicated in FIG. 4, a milling cutter 36 designed with a ball end tip and a tapered body will result in a hole diameter vs. depth characteristic which is advantageous for this application. The effective control loop feedback gain is proportional to change in hole diameter resulting from a change in depth, i.e., ($\partial D / \partial \Delta S$). FIG. 4 shows this function to be a constant for depths greater than a critical depth $\Delta s_c$ and inversely proportional to $\Delta s$ for depths less than $\Delta s_c$. Thus, feedback gain is increased as the excess material becomes small. This provides tighter control over the final phases of the grinding process, thus preventing the removal of too much material. The selection of the cutter parameters R and $\theta$ (FIG. 4) can optimize the feedback gain characteristics for the particular application.

Referring to FIG. 4, the relationship between hole diameter and depth may be obtained as follows:

for $x < R\cos\theta$, $$D_2 = 2[R^2 - (R - \Delta s)^2]^{\frac{1}{2}}$$

$$\cong \sqrt{8R} \ (\Delta s)^{\frac{1}{2}}$$

for $x > R\cos\theta$, $$D_1 = (2\tan\theta)\Delta s + 2R \left( \frac{1}{\cos\theta} - \tan\theta \right)$$

where $D$ = hole diameter $\Delta s$ = excess material $\theta$ = mill taper above ball end $R$ = ball end radius $G = \frac{\partial D}{\partial \Delta s}$ = feedback sensitivity $\Delta s_c$ = critical depth for $\Delta s > \Delta s_c$, $$G = 2\tan\theta$$

for $\Delta s < \Delta s_c$ $$G = \sqrt{2R} \ \frac{1}{\Delta s}$$

Figure 4A:
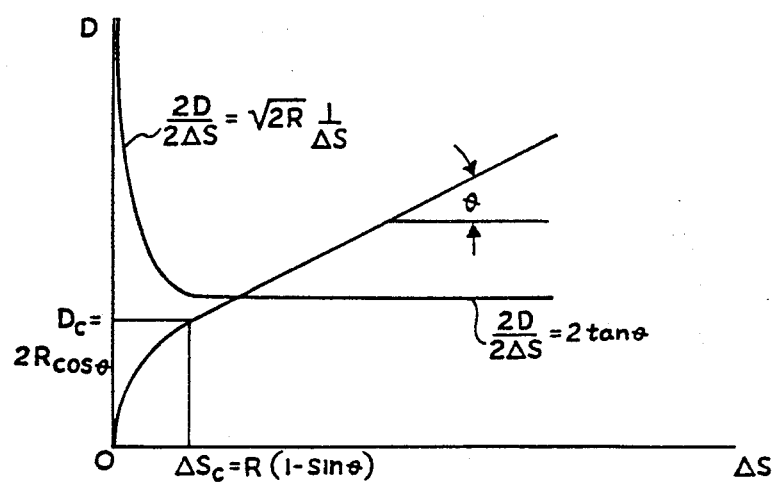
FIG. 4a is a graphical representation of the relationship between hole diameter and depth characteristic, when using the milling cutter of FIG. 4.

The graphical relationship between the parameters is shown in FIG. 4a.

The ultimate accuracy of the finished surface depends on the accuracy with which the reference holes can be drilled so that the spherical bottom of the hole lies tangent to the desired finished surface. This, in turn, depends on two factors. First, the calculation of $\Delta S_o | S_R$ defined by FIG. 3 must be accurate. Since it can be assumed that both the desired surface and the mathematical computation of $\Delta S_o | S_R$ can be as accurate as required, the accuracy of the measured surface $S_o$ is the only concern. Thus, the system is limited by the accuracy of the external measurement subsystem. The second factor is achieving proper hole depth is dependent on the implementation of the drilling process. Ideally, the drill axis must be colinear with the normal line of FIG. 3, and the drill bottom must penetrate to exactly the desired surface and no further. The robot manipulator 18, however, does not have the absolute positional accuracy to achieve either of these requirements. These limitations are largely overcome by the implementation shown in FIGS. 5 and 6.

In FIG. 5, a schematic view of the drilling mechanism and optical sensor is shown. The milling bit 38 is rotated by a drill motor 60 and is movable along its axis of rotation by a vertical drive motor 62 and gear mechanism 64. The drill reference post 40 serves to provide a reference point A which is placed on the object surface by the robot manipulator. A vertical compliant bushing 66 provides mechanical relief in the vertical direction. In conjunction with the pressure sensor 42 feedback to the computer 16, this mechanism 44 assures that the reference point A is placed on the object surface by the robot 24 with the proper force.

The imaginary plane through point A and normal to the drill axis is the O depth reference plane. This plane is identical to the x, y plane shown in FIG. 6. Level gauges 46 and 48 (FIG. 5) contain spring loaded plungers which place reference points B & C on the object surface. Electrical mechanisms (such as potentiometers) which sense the extension of the plungers, provide for locating reference points B and C with respect to the x, y plane of FIG. 6. If the object surface is assumed reasonably flat between points A, B and C, then the locations of points B and C fully define the object surface in the drill x, y, z coordinate system.

An optical sensor 50 is mechanically affixed to the drill so that its optical axis and field of view provide visibility of the object surface between points A, B and C. This sensor (typically a TV camera) will sense and locate the reference mark $S_R$ which was previously placed on the surface and for which the excess material data is given in accordance with FIG. 3. A ray through the known optical sensor node and point $S_R$ is thus defined. The intersection of this ray with the object surface defined by points A, B and C thus locates reference point $S_R$ in x, y, z space. Most particularly, the displacement $\Delta S_R$ in the z direction, i.e. above or below the x, y (O depth reference) plane, is defined.

Figure 6:
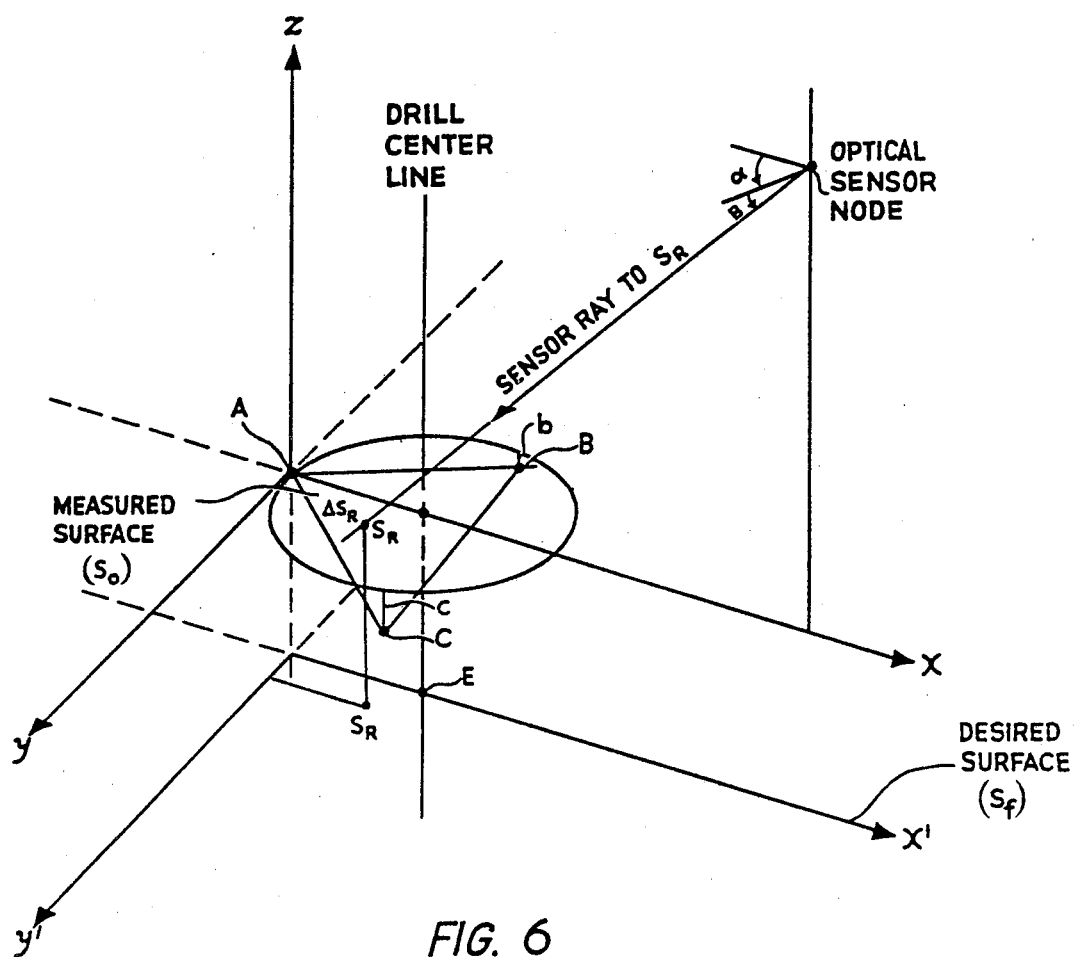
FIG. 6 is a geometrical diagram and shows the inter-relationships of parameters used in conjunction with the arrangement of FIG. 5.

The drill axis is oriented by the robot manipulator to be perpendicular to the desired surface shown as the x', y' plane of FIG. 6. It may be assumed that the desired surface is reasonably flat over this small region of interest. Then, the distance along the drill center line between the desired surface (x', y' plane) and the O depth reference (x, y) plane is defined to be $\Delta S_o | S_R + \Delta S_R$. The milling bit is therefore to be driven vertically to a depth of $\Delta S_o | S_R + \Delta S_R$ below the O depth reference plane. This will bring the ball end of the miller precisely tangent to the desired surface at point E of FIG. 6. The inaccuracy of the drill placement in x, y and the slope of the object surface with respect to the desired surface have thus been properly compensated for by the arrangement in accordance with the present invention.

The drill depth control feedback is achieved by units 50 and 52 in FIG. 1. Parameters $\alpha$, $\beta$ defined by the geometry in FIG. 6, are fed to computer 16 by the vision unit 50, as shown in FIG. 1. Similarly, parameters b and c in FIG. 6 are supplied to the computer by unit 52. The blocks in FIG. 1 are conventional elements known in the art, and the functions performed by these blocks can even be carried out manually by hand, and manual sensing and observation, for example.

An essential feature of the present invention, therefore, is that the material removal equipment need not have an absolute positional accuracy which is equal to the accuracy of the desired finished surface. Sensing of the diameters of the holes is carried out in real time to provide feedback control for the grinding or material removal process.

The automated finishing process according to the present invention is applicable not only to grinding, but to other finishing methods including sanding, milling and other abrasive material removal mechanisms.

The hole diameters, as observed by the vision system 26, can be determined either by a two-dimensional pattern analysis or by three-dimensional measurement. The former method requires only a single camera, but it is necessary to paint the surface prior to the beginning of material removal. This latter process can be eliminated by using a three-dimensional sensor in the form of a camera and projector, with appropriate processing.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for removing material from an object to provide a desired finished surface, comprising the steps of: drilling holes into the object so that the bottoms of the holes lie on the desired finished surface, said holes having a shape so that the observed hole diameter at the prevailing surface of the object is dependent on the hole depth and thereby dependent on the amount of material remaining to be removed between the prevailing surface and the desired finished surface; observing and measuring the prevailing surface; calculating depths of material to be removed in a sequence of material removing steps dependent on measurements of the prevailing surface and desired finished surface; controlling the depth of material removed from said calculating step during each of said material removing steps; and carrying out said material removing steps in sequence so that after the completion of the last step the surface exposed on the object coincides with the desired finished surface.

2. A method as defined in claim 1 wherein the accuracy of said material removing steps is substantially less than the accuracy of the desired finished surface.

3. A method as defined in claim 1 wherein parameters of said holes are measured in real time prior to or during each material removal step.

4. A method as defined in claim 1 wherein said material removal steps comprise total milling steps.

5. A method as defined in claim 1 wherein said material removal steps comprise sanding steps for removing material by abrasives.

6. A method as defined in claim 1 wherein diameters of said holes are observed by a two-dimensional pattern measurement.

7. A method as defined in claim 1 wherein diameters of holes are observed by a three-dimensional measurement.

8. An arrangement for removing material from an object to provide a desired finished process, comprising: means for drilling holes into the object so that the bottom of the holes lie on the desired finished surface, said holes having a shape so that the observed hole diameter at the prevailing surface of the object is dependent on the hole depth and thereby dependent on the amount of material remaining to be removed between the prevailing surface and the desired finished surface; means for observing and measuring the prevailing surface; means for calculating depths of material to be removed in a sequence of material removing steps dependent on measurements of the prevailing surface and desired finished surface; means for controlling the depth of material removed from said calculating step during each of said material removing steps; and means for carrying out said material removing steps in sequence so that after the completion of the last step the surface exposed on the object coincides with the desired finished surface.

9. An arrangement as defined in claim 8 wherein said means for carrying out said material removing steps has an accuracy substantially less than the accuracy of the desired finished surface.

10. An arrangement as defined in claim 8 wherein diameters of said holes are measured in real time prior to carrying out said material removing steps.

11. An arrangement as defined in claim 8 wherein said holes are drilled to a predetermined depth by sensing the surface and controlling drill depth with respect to that surface.

* * * * *